July 31, 1962     J. W. KOVACH     3,047,014
FIVE-TEMPERATURE NON-THERMAL MIXING VALVE
Filed Dec. 19, 1957     2 Sheets-Sheet 1
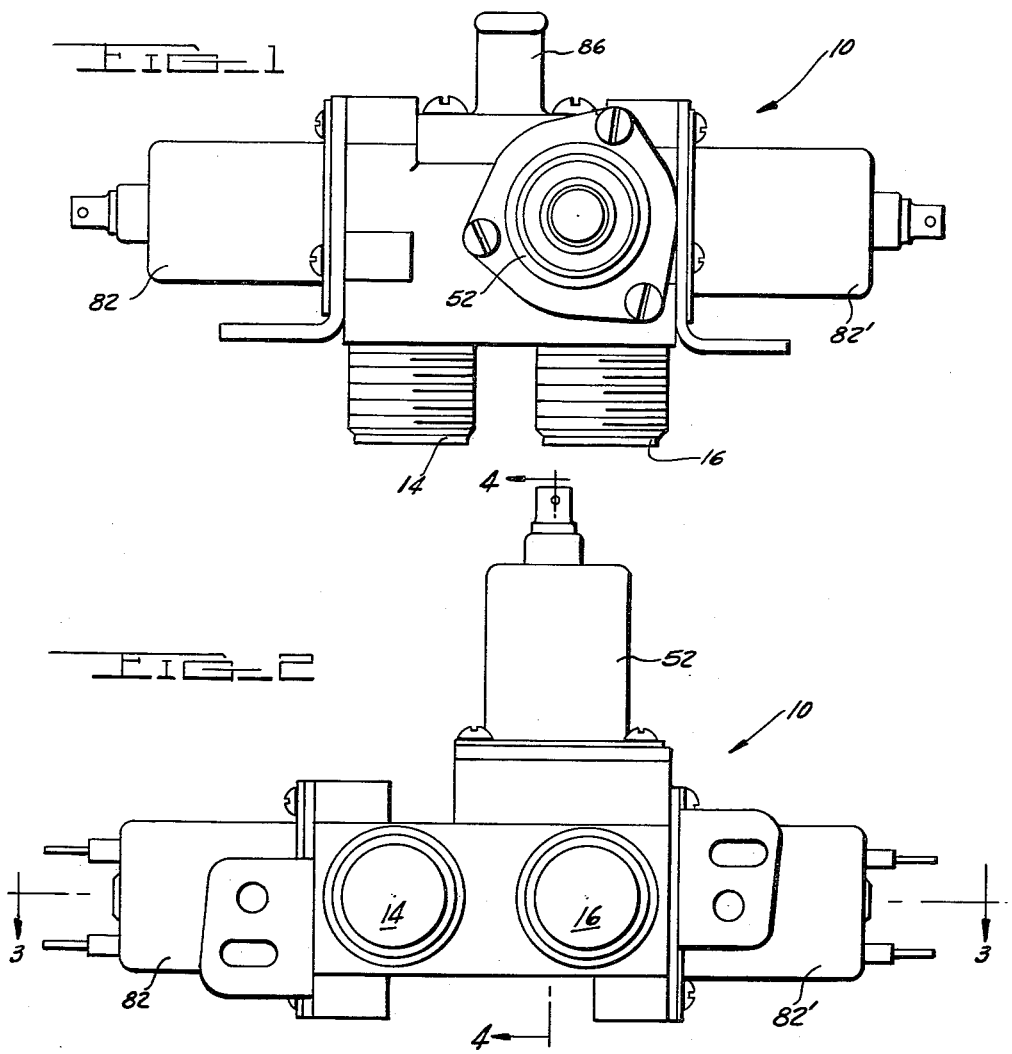
INVENTOR.
*Julius William Kovach*
BY
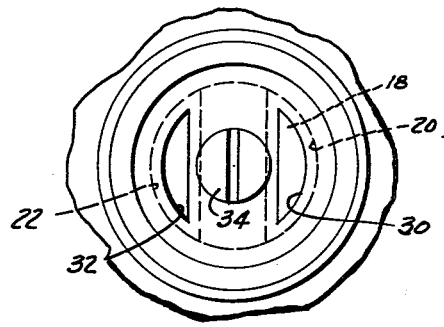

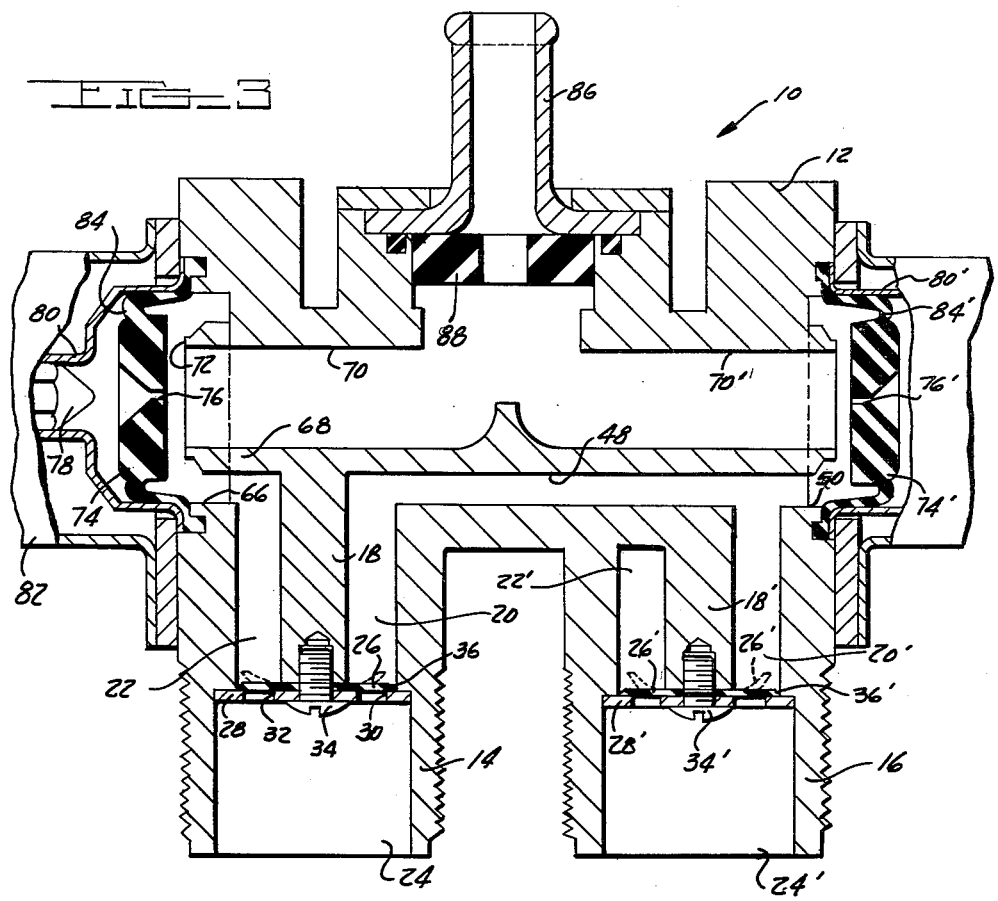
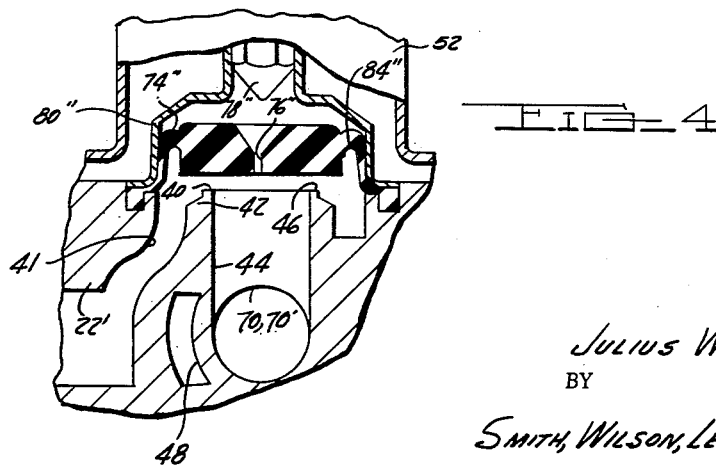

3,047,014
FIVE-TEMPERATURE NON-THERMAL MIXING VALVE
Julius William Kovach, Detroit, Mich., assignor to American Radiator & Standard Sanitary Corporation, New York, N.Y.
Filed Dec. 19, 1957, Ser. No. 703,895
2 Claims. (Cl. 137—607)

This invention relates to a valve useful for mixing hot and cold fluids together prior to their entry into the tub of an automatic clothes washing machine.

Objects of the invention are to provide a valve of the above character wherein:

(1) The valve is provided with solenoid-operated valve elements, whereby to enable discharge of at least five different temperature fluids by selective energization of the solenoids.

(2) The valve is of relatively low cost construction (considering the functions which it is designed to perform), and (3) The valve is of a comparatively compact configuration so as to adapt it for use within small clearance spaces in automatic clothes washing machines.

Other objects of this invention will appear in the following description and appended claims, reference being had to the accompanying drawings forming a part of this specification wherein like reference characters designate corresponding parts in the several views.

In the drawings:

FIGURE 1 is a plan view of one embodiment of the invention, with one of the solenoids removed for illustration purposes.

FIGURE 2 is an elevational view of the FIGURE 1 embodiment.

FIGURE 3 is a sectional view on line 3—3 in FIGURE 2.

FIGURE 4 is a broken sectional view on line 4—4 in FIGURE 2.

FIGURE 5 is an elevational view showing fluid inlet conduits in the FIGURE 1 embodiment.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a mixing valve 10, comprising a valve body 12 having a threaded hot fluid inlet conduit 14 and a threaded cold fluid inlet conduit 16. The hot and cold fluid inlets 14 and 16 are substantially the same. The description of the hot fluid inlet 14 will also apply to the cold fluid inlet 16.

As best seen in FIGURES 3 and 5, a wall 18 extends axially and diametrically within conduit 14 so as to form two separate passages 20 and 22 for receiving hot fluid from the upstream section 24 of the conduit. An elastomeric resilient valve disk 26 extends across the conduit so as to prevent reverse flow out of passages 20 and 22. Disk 26 is positioned between the upstream edge of wall 18 and a circular metal disk 28, which is provided with flow-through openings 30 and 32. A screw 34 clamps disk 26 and plate 28 onto wall 18; the arrangement being such that the fluid pressure in conduit section 24 acts through openings 30 and 32 onto disk 26 so as to deflect the outer edges thereof in a downstream direction (as indicated by the dotted lines in FIGURE 3), whereby the hot fluid is enabled to flow into passages 20 and 22. Reverse fluid flow out of passages 20 and 22 is prevented by flush edge portion 36, which seats tightly against the downstream face of plate 28 in response to high fluid pressures in passages 20 and 22.

It will be noted that hot fluid passage 22 communicates with an annular passage 66 formed by annular wall 68. The inner surface of wall 68 defines a cylindrical passage 70 which extends inwardly from an annular valve surface 72. Fluid flow from passage 66 into passage 70 is controlled by an elastomeric diaphragm 74 which is provided with a central opening 76. An armature plunger 78 is slidably arranged in fixed guide sleeve 80 for axial movement toward and away from opening 76. Guide sleeve 80 is contained within a solenoid 82, the arrangement of parts being such that when the solenoid is energized plunger 78 is forced outwardly to its FIGURE 3 position where it is spaced from opening 76.

In the FIGURE 3 position the pressure of fluid in passage 66 is sufficient to hold diaphragm 74 away from valve surface 72 so as to permit fluid flow into passage 70. When solenoid 82 is de-energized a spring in the outer end of sleeve 80 (not shown) biases plunger 78 to a position closing opening 76. As a result the fluid in passage 66 is enabled to flow through bleed opening 84 so as to develop a rightward pressure on the left face of the diaphragm. This fluid pressure closes the diaphragm against valve surface 72 so as to halt fluid flow from passage 66 into passage 70.

A passage 48 extends laterally from the hot fluid passage 20 into communication with the cold fluid passage 20'. The arrangement is such that hot fluid from passage 20 and cold fluid from passage 20' mix together in the passage 48 so as to produce a warm fluid stream. An annular passage 50 extends right angularly from the juncture of the passages 20' and 48. The passage 50 is in axial alignment with the annular passage 66.

Warm fluid passage 50 encricles a passage 70', which is aligned with passage 70, the arrangement of parts being such that fluid from passage 50 into passage 70' is controlled by a diaphragm 74' operating in the same manner as diaphragm 74.

A passage 41 as shown in FIGURE 4 extends from the separate cold fluid passage 22' into communication with an annular passage 40 located adjacent the top of the valve body 10. The annular passage 40 is formed by the annular wall 42. The inner surface of the wall 42 defines a cylindrical outlet passage 44 which extends downwardly from an annular valve surface 46 at right angles to the cylindrical outlet passages 70, 70'. The arrangement of parts is such that fluid flows from passage 22' into passage 41, passage 40 and thence into outlet passage 44. The fluid flow is controlled by a diaphragm 74" operating in the same manner as diaphragms 74 and 74'.

An outlet spigot 86 is provided communicating with the outlet passages 44, 70, 70' approximately at their juncture. A conventional flow washer 88 may be secured adjacent the spigot 86 to maintain constant quantity fluid flow, through the spigot 86, irrespective of variations in pressure in the hot and cold fluid streams.

It is possible to obtain seven different fluid temperatures from the outlet spigot 86 by closing and opening various of the diaphragms 74, 74' and 74". The five most used temperatures are the hot, obtained by opening diaphragm 74 and closing diaphragms 74' and 74", the intermediate hot, obtained by opening diaphragms 74, 74' and closing diaphragm 74", the warm, obtained by opening diaphragm 74' and closing diaphragms 74, 74", the cool, obtained by opening diaphragms 74', 74" and closing diaphragm 74 and the cold, obtained by opening diaphragm 74" and closing diaphragms 74, 74'.

It will be noted from FIGURE 2 that the valve body 10 is fairly compact so as to adapt it for use in relatively small spaces. The "compact" character of the valve body 10 is made possible by the fact that all of the passages are located in the same plane, with no enlarged interior passage areas which would increase the valve body 10 thickness. Also the design of the valve has eliminated the need for bulky and costly thermostats sometimes incorporated in mixing valves of the present type. The simplicity of the passage structure obtained by walls 18, 18' also contributes to valve body compactness and lowered costs.

I claim:

1. In a five-temperature liquid mixing valve, a valve valve body having first and second inlet conduits for introducing hot and cold liquids into the valve, a wall within each of the conduits forming two separate passages within each conduit for receiving fluid, a resilient check valve disk positioned against the upstream edge of each of said walls and extending across said inlet conduits, an apertured wall member positioned against the upstream face of each of said resilient disks to prevent reverse fluid flow into the fluid conduits, first annular passage extending from one of said passages of said first inlet conduit, a passage extending from the other passage of said first inlet conduit into interconnection with one of the passages of said second inlet conduit, a second annular passage extending from said interconnected passage of said second inlet conduit, said first and second annular passages being axially aligned, first and second outlet passages extending axially within the first and second annular passages to form first and second annular valve surfaces, a third outlet passage commuicating with said first and second outlet passages, a third annular passage surrounding said third outlet passage to form a third annular valve surface, a passage connecting said third annular passage with the other passage of said second inlet conduit, diaphragms secured to the valve body and extending actuated plunger overlying each of the diaphragms for selectively opening and closing the three connected passages to provide five outlet fluid temperature combinations.

2. In a five-temperature liquid mixing valve, a valve body having first and second parallel inlet conduits for introducing liquids of differing temperatures into the valve, a wall within each of the conduits forming two separate passages within each conduit for receiving fluid, a resilient check valve disk positioned against the upstream edge of each of said walls and extending across said inlet conduits, an apertured wall member positioned against the upstream face of each of said resilient disks to prevent reverse fluid flow into the fluid conduits, an annular passage extending right angularly from one of said passages of said first inlet conduit, a passage extending laterally from the other passage of said first inlet conduit into communication with one of the passages of said second inlet conduit, a second annular passage extending right angularly from said interconnected passage of said second inlet conduit and in axial alignment with the first annular passage, said first and second annular passages being axially aligned, two connected outlet passages extending axially within the first and second annular passages to cooperate therewith to form first and second annular valve surfaces, a third outlet passage communicating with said first and second outlet passages and extending right angularly therefrom, a third annular passage surrounding said third outlet passage and cooperating therewith to form a third annular valve surface, a passage connecting said third annular passage with the other passage of said second inlet conduit, diaphragms secured to the valve body and extending across said annular valve surfaces, and a solenoid actuated plunger overlying each of the diaphragm for selectively opening and closing the three connected passages to provide five outlet fluid combinations.

References Cited in the file of this patent

UNITED STATES PATENTS

| | | |
|---|---|---|
| 2,453,409 | Chace | Nov. 9, 1948 |
| 2,542,279 | Kempton | Feb. 20, 1951 |
| 2,672,157 | Branson | Mar. 16, 1954 |
| 2,698,029 | Branson | Dec. 28, 1954 |
| 2,708,092 | Smith | May 10, 1955 |
| 2,712,324 | Lund | July 5, 1955 |

UNITED STATES PATENT OFFICE
CERTIFICATE OF CORRECTION

Patent No. 3,047,014

July 31, 1962

Julius William Kovach

It is hereby certified that error appears in the above numbered patent requiring correction and that the said Letters Patent should read as corrected below.

Column 3, line 37, after "extending" insert -- across each of said annular valve surfaces, and a solenoid --; column 4, line 31, after "fluid" insert -- temperature --.

Signed and sealed this 20th day of November 1962.

(SEAL)
Attest:

ERNEST W. SWIDER
Attesting Officer

DAVID L. LADD
Commissioner of Patents